(12) United States Patent
Popp et al.

(10) Patent No.: US 12,458,254 B2
(45) Date of Patent: Nov. 4, 2025

(54) SYSTEM FOR MEASURING THE PRESENCE AND/OR THE CONCENTRATION OF AN ANALYSIS SUBSTANCE DISSOLVED IN A BODILY FLUID

(71) Applicant: TRUMPF Venture GmbH, Ditzingen (DE)

(72) Inventors: Andreas Popp, Markgroeningen (DE); Dieter Kraft, Gerlingen (DE)

(73) Assignee: TRUMPF VENTURE GMBH, Ditzingen (DE)

( * ) Notice: Subject to any disclaimer, the term of this patent is extended or adjusted under 35 U.S.C. 154(b) by 844 days.

(21) Appl. No.: 17/521,875

(22) Filed: Nov. 9, 2021

(65) Prior Publication Data

US 2022/0133185 A1 May 5, 2022

Related U.S. Application Data

(63) Continuation of application No. PCT/EP2020/062555, filed on May 6, 2020.

(30) Foreign Application Priority Data

May 10, 2019 (DE) ...................... 10 2019 112 346.1

(51) Int. Cl.
*A61B 5/145* (2006.01)
*A61B 5/00* (2006.01)

(52) U.S. Cl.
CPC ........ *A61B 5/14532* (2013.01); *A61B 5/0068* (2013.01); *A61B 5/0075* (2013.01); *A61B 5/0077* (2013.01)

(58) Field of Classification Search
CPC . A61B 5/14532; A61B 5/0068; A61B 5/0075; A61B 5/0077; A61B 2562/0233;
(Continued)

(56) References Cited

U.S. PATENT DOCUMENTS

| | | | |
|---|---|---|---|
| 5,243,983 | A | 9/1993 | Tarr et al. |
| 5,615,673 | A | 4/1997 | Berger et al. |

(Continued)

FOREIGN PATENT DOCUMENTS

| | | |
|---|---|---|
| CN | 102928394 A | 2/2013 |
| CN | 104224198 A | 12/2014 |

(Continued)

*Primary Examiner* — Jamil Ahmed
(74) *Attorney, Agent, or Firm* — LEYDIG VOIT & MAYER LTD.

(57) ABSTRACT

A system for measuring the presence and/or the concentration of an analysis substance dissolved in a bodily fluid includes a light source configured to emit excitation light and an optical device. The optical device defines, for the excitation light, an excitation beam path from the light source to a measurement region of a sample and, for scattered light from the measurement region of the sample, a detection beam path from the measurement region of the sample to a detection device. The system also includes a detection device configured to detect the scattered light. The detection device includes a light-sensitive sensor and a filter element arranged in the detection beam path, the filter element being designed to suppress a transmission of light with wavelengths outside of an analysis wavelength range around a Raman resonance of the analysis substance.

10 Claims, 2 Drawing Sheets

(58) Field of Classification Search
CPC ............ A61B 5/1455; G01J 2003/2806; G01J 2003/2813; G01J 3/0208; G01J 3/2803; G01J 3/44; G01N 21/65; G01N 21/47
See application file for complete search history.

(56) References Cited

U.S. PATENT DOCUMENTS

| | | |
|---|---|---|
| 6,167,290 A | 12/2000 | Yang et al. |
| 2007/0060806 A1 | 3/2007 | Hunter et al. |
| 2012/0035442 A1* | 2/2012 | Barman ................ G01J 3/0208 600/316 |
| 2016/0123869 A1 | 5/2016 | Messerschmidt |
| 2017/0135582 A1 | 5/2017 | Cho et al. |
| 2019/0064072 A1 | 2/2019 | Kim et al. |
| 2020/0284883 A1* | 9/2020 | Ferreira ................ H04N 25/773 |

FOREIGN PATENT DOCUMENTS

| | | |
|---|---|---|
| CN | 208140255 U | 11/2018 |
| CN | 109425572 A | 3/2019 |
| DE | 69121589 T2 | 1/1997 |
| GB | 2557311 A | 6/2018 |
| KR | 20100022614 A | 3/2010 |
| WO | WO 2013065035 A1 | 5/2013 |

\* cited by examiner

SYSTEM FOR MEASURING THE PRESENCE AND/OR THE CONCENTRATION OF AN ANALYSIS SUBSTANCE DISSOLVED IN A BODILY FLUID

FIELD

The disclosure relates to a system for measuring the presence and/or the concentration of an analysis substance, in particular blood sugar, dissolved in a bodily fluid.

BACKGROUND

Such systems allow the presence and/or the concentration of an analysis substance dissolved in bodily fluid, for example the blood sugar level in human blood, to be ascertained, and to be precise preferably without a corresponding tissue or blood sample having to be taken in advance (non-invasive measurement). In particular, the measurement can be implemented in transdermal fashion, that is to say through the skin layers. In this way, the patient need not prick, e.g., a finger to take a drop of blood, which is regularly tedious and quite possibly uncomfortable.

Measuring the presence and/or the concentration of the analysis substance (e.g., ascertaining the blood sugar level) using such a system is based on the analysis of Raman scattered light, which is generated by inelastic scattering of excitation light at a medium to be analyzed (e.g., blood) or at the constituent parts of the medium (e.g., blood sugar, especially glucose, dissolved in the blood). The wavelengths of the Raman scattered light differ from the wavelength of the excitation light and are characteristic for specific rotation or vibration processes of the analyzed medium. In this way it is possible to identify the molecular composition of the analyzed medium and/or the concentration of specific molecules (e.g., blood sugar) in the medium (e.g., blood).

To detect the Raman scattered light use is made, for example, of spectrometer apparatuses which usually comprise a diffractive or dispersive element, in particular a grating, for the spatial-spectral split of the incident Raman scattered light, and a spatially resolving detector for the wavelength-dependent detection of the split light. A corresponding system for analyzing blood sugar using a spectrometer is described in US 2007/0060806 A1, for example.

A disadvantage of such systems with spectrometers is that already relatively small changes in the relative position between the diffractive or dispersive element and the detector (e.g., as a result of the fall or temperature change) can lead to a displacement of the beam path and consequently to an incorrect measurement result. For this reason the system needs to be checked regularly and calibrated within the scope of servicing, which requires specialist knowledge. Moreover, a beam path of a certain length is required between dispersive/diffractive element and detector for a spectral split of the light, in order to be able to detect the spectral components of the scattered light spatially separately from one another. Corresponding systems are therefore regularly comparatively large and can therefore have disadvantages during daily operation.

SUMMARY

In an embodiment, the present disclosure provides a system for measuring the presence and/or the concentration of an analysis substance dissolved in a bodily fluid. The system includes a light source configured to emit excitation light and an optical device that defines, for the excitation light, an excitation beam path from the light source to a measurement region of a sample. The optical device also defines, for scattered light from the measurement region of the sample, a detection beam path from the measurement region of the sample to a detection device. The system also includes a detection device configured to detect the scattered light. The detection device includes a light-sensitive sensor and a filter element arranged in the detection beam path, the filter element being designed to suppress a transmission of light with wavelengths outside of an analysis wavelength range around a Raman resonance of the analysis substance.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
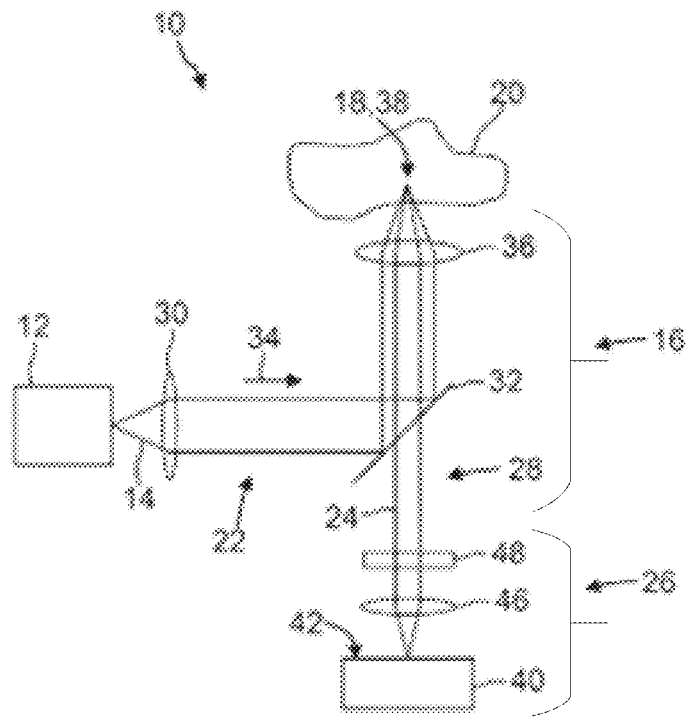
FIG. 1 shows a sketched illustration of a system in a first embodiment.

The disclosure considers the problem of facilitating, with little calibration outlay and a compact structure, a reliable analysis of an analysis substance dissolved in a bodily fluid. Moreover, a cost-effective configuration is desirable.

The system overall is an apparatus, in the sense of an aggregate of things, of a plurality of devices which, in particular, are connected to form an apparatus or are integrated in a superordinate apparatus. The system serves to measure, especially in transdermal fashion, the presence and/or the concentration of an analysis substance dissolved in bodily fluid, in particular to ascertain a blood sugar concentration. Blood sugar is understood to mean, in particular, sugar, in particular glucose, dissolved in bodily fluid, for example in human blood.

The system comprises a light source for emitting excitation light and an optical device which for the excitation light defines an excitation beam path from the light source to a measurement region of a sample and which for scattered light with a Raman component (i.e., a Raman-scattered component) from the measurement region of the sample defines a detection beam path from the measurement region of the sample to a detection device. The optical device can comprise a plurality of optical elements (e.g., lenses, reflectors, prisms, stops, optical fibers), by means of which the excitation beam path and the detection beam path are defined. In particular, the sample can be a tissue region which contains a bodily fluid and is located below the human skin surface, for example in the region of an arm or a finger.

The system further comprises a detection device for detecting the scattered light, in particular with the Raman component. The detection device preferably comprises a light-sensitive sensor which in particular is designed to generate measurement signals, preferably electrical measurement signals, from the captured light.

The detection device moreover comprises at least one filter element arranged in the detection beam path, the at least one filter element being designed to suppress a transmission of light with wavelengths outside of a respective analysis wavelength range around a respective Raman resonance, to be analyzed, of the analysis substance, in particular blood sugar. In this respect, the at least one filter element is designed such that the wavelengths of the Raman scattered light irrelevant to an analysis of a respective Raman resonance can be substantially filtered out, i.e., not be transmitted to the sensor.

Such a configuration already facilitates an approximate evaluation to the effect of whether the analysis substance is present in the sample with a certain threshold concentration. The reliability of the measurement can be further increased if there is a further spectral split and measurement of the Raman scattered light, as still explained in more detail below. In this way, a compact structure of the system is facilitated since there is no need to keep available additional installation space for the beam paths required for the split. Blood sugar measuring appliances having such a system therefore can have a comparatively small embodiment, simplifying the handling thereof. Moreover, blood sugar measuring appliances having such a system are particularly robust. By contrast, known spectrometer structures are regularly sensitive in view of tremors. This is particularly advantageous since diabetics must regularly—and consequently also on the go or when traveling—monitor the blood sugar level.

The maintenance outlay of the present system is reduced since a regular calibration of a spectrometer, required in systems known from the prior art, is dispensed with. Moreover, the system is comparatively cost-effective since there is no need for elements with a spectrally splitting effect such as, e.g., gratings—which are comparatively expensive on account of the high precision required.

It is possible that only one characteristic Raman resonance of the analysis substance should be analyzed. Then, the at least one filter element can be designed to suppress a transmission of light with wavelengths outside of an analysis wavelength range around this Raman resonance. It is also possible that a plurality of Raman resonances should be analyzed. Then, the at least one filter element can be designed to suppress a transmission of light with wavelengths outside of the respective analysis wavelength ranges around the respective Raman resonance to be analyzed.

Preferably, the respective analysis wavelength range is less than 1500 nm, in particular between 850 nm and 1500 nm, further particularly between 850 nm and 950 nm. The Raman resonances of glucose dissolved in human blood which are relevant to the determination of the concentration are located in this wavelength range. It is particularly preferable for the analysis wavelengths to be a sub-range of the wavelength range from 850 nm to 950 nm. By way of example, the light source can emit an excitation light with wavelengths in the range from 600 nm to 840 nm, with other configurations also being possible. Configurations in which the light source emits light with a broad spectrum are also conceivable.

In particular, it is preferable for the respective analysis wavelength range to be in a wavelength range of $\pm 10$ nm, preferably $\pm 5$ nm, further preferably $\pm 2.5$ nm, further preferably $\pm 1$ nm around a respective selected, characteristic Raman resonance of the analysis substance, in particular glucose as a solution in human bodily fluid (e.g., in human blood). This facilitates a selective analysis of a selected characteristic Raman resonance of the analysis substance while avoiding further disturbance signals, for example as a result of further Raman resonances.

Preferably, the at least one filter element is arranged and/or designed such that a component of the scattered light in the detection beam path strikes the sensor, in particular a portion of the sensor, as reference light which remained uninfluenced by the at least one filter element. In particular, the at least one filter element is arranged and/or designed such that at least one component of the excitation light that was elastically scattered by the sample strikes the sensor. This allows the light source to be checked in respect of functionality and/or the calibration of the optical device to be checked. For this purpose it is possible that a portion of the sensor is not covered by the at least one filter element. Then, light can strike the sensor past the at least one filter element. It is also possible for the at least one filter element to be transmissive in at least one filter region to the excitation light that was reflected, or elastically scattered, by the sample.

In an advantageous configuration, the at least one filter element is designed as a component with a planar extent. Then there is no need for precise spatial focusing of the scattered light, which may further reduce calibration outlay. In particular, the at least one filter element extends in a plane. By way of example, it is possible for the at least one filter element to have a slab-like embodiment.

In particular, the sensor comprises a detecting sensor surface. Very preferably the at least one filter element is arranged on the sensor surface. In particular, the sensor surface can have a planar embodiment; then the at least one filter element can be arranged on the planar sensor surface in slab-like fashion. This facilitates a two-dimensional detection of the Raman scattered light. In this respect, there is no need to focus the Raman scattered light at a certain region of the sensor surface.

Further, a particularly compact structure of the detection device, and hence of the system, is obtained by virtue of the fact that the at least one filter element is arranged on the sensor surface. It is particularly preferred for the at least one filter element and the sensor to be securely connected to one another, in particular to be embodied in monolithic form or to be joined into a pre-assembled component part. In this respect, there cannot be an inadvertent shift or disturbance of the beam path between filter element and sensor. In this way, a particularly robust structure is obtained, as a result of which it is possible to eliminate the risk of an unwanted maladjustment—for example as a result of the system falling on the ground—and hence it is possible to minimize calibration outlay. By way of example, it is possible for corresponding filter structures to be vapor-deposited on the sensor surface or to be produced on the latter by lithography.

Preferably, the sensor has an array of light-sensitive pixels which are configured to detect incident light. By way of example, it is possible for the light-sensitive pixels to be arranged in rows and columns. Further, it is preferable for the at least one filter element to have a plurality of narrowband filter regions. Preferably, the narrowband filter regions are designed to suppress a transmission of light with wavelengths outside a pass range around a central wavelength. In particular, the narrowband regions act as bandpass filters for a corresponding wavelength range which is narrow in comparison with the analysis wavelength range.

Further preferably, one filter region is respectively assigned to one pixel group of adjacently arranged pixels, in particular to one pixel. Preferably, a filter region is arranged on each pixel. In particular, it is preferable for the filter regions and the pixel groups or pixels to be assigned to one another in such a way that along the detection beam path light passing through a respective filter region is only captured by the respectively assigned pixel group or by the respectively assigned pixel. By way of example, it is possible for the filter regions of the at least one filter element to be arranged in rows and columns, with the filter regions being arranged in such a way that a filter region is arranged in front of each pixel of the sensor.

In particular, it may also be advantageous if no filter region is arranged in front of at least one pixel or at least one pixel group. Then, a component of the light in the detection beam path, in particular the excitation light which was reflected, or elastically scattered, by the sample, can strike this at least one pixel and, as explained above, be detected as reference light. By way of example, it is conceivable for the at least one filter element to have a local cutout corresponding to the size of a pixel. It is also conceivable for no filter structure to have been vapor-deposited on the at least one pixel, for example in an edge region of the sensor or the sensor surface.

Further, it is preferable for filter regions to be provided with central wavelengths that differ from one another. It is possible that each filter region of the filter element has a different central wavelength. Then, a filter region with a different central wavelength can be assigned to each pixel/ each pixel group of the sensor. The central wavelengths can be chosen such that different spectral ranges are detected using only one sensor. This renders it possible to approximate the spectral peak of the Raman resonance to be analyzed and thus to distinguish whether a measured intensity peak represents a Raman resonance or merely a disturbance signal. Such a configuration also allows a plurality of characteristic Raman resonances to be analyzed using only one sensor and one filter element. Here, this can relate to a plurality of Raman resonances of the analysis substance— which may be advantageous for example for a precise determination of the concentration of the analysis substance in the bodily fluid—and/or characteristic Raman resonances of different substances (e.g., glucose and lactate or medical active ingredients) dissolved in the bodily fluid.

In particular, it can be advantageous if at least one filter region of the at least one filter element is designed to transmit light with wavelengths of the excitation light as a reference light. This renders it possible to check the spectral properties of the excitation light, in particular to identify possible faults that by a change in the wavelength of the excitation light (e.g.,—in the case of a configuration of the light source as a laser diode—as a consequence of the laser diode "detuning").

It is particularly preferred for a plurality of filter regions of the filter element to have the same central wavelength, in particular the same pass ranges. Then, filter regions with the same central wavelengths, in particular the same pass ranges, can be assigned to a plurality of pixels/pixel groups. In this way, light of a certain wavelength can be detected by a plurality of pixels, which has a positive effect on the signal-to-noise ratio.

To facilitate a detailed analysis of the spectral peak of the Raman resonance to be examined (e.g., the shape, full width at half maximum, etc.), it is preferable for the central wavelengths to be distributed at spectrally spaced-apart intervals over the (respective) analysis wavelength range. Preferably, the intervals are distributed equidistantly. It is particularly preferable for the intervals between the central wavelengths of the filter regions assigned to a respective analysis wavelength range to be less than 5 nm, preferably less than 2 nm, further preferably less than 1 nm, further preferably less than 0.5 nm, further preferably less than 0.2 nm. A smaller interval is advantageous for a higher spectral resolution (more measurement points in the analysis wavelength range). By contrast, a larger interval is advantageous for a higher signal-to-noise ratio (more pixels detect light of the same wavelength).

A particularly advantageous configuration consists of the filter regions assigned to a respective analysis wavelength range forming a filter group which repeats, preferably repeats periodically, over the filter element. It is possible that only one characteristic Raman resonance of the analysis substance should be analyzed. In this case, a single filter group can be provided, which is formed by the filter regions assigned to the analysis wave range of this Raman resonance. This filter group can then repeat periodically, for example like a mosaic, over the filter element. It is also possible that a plurality of characteristic Raman resonances should be analyzed (for example a plurality of Raman resonances of the analysis substance or Raman resonances of different substances dissolved in bodily fluid). In this case, the filter element can have a plurality of different filter groups, wherein the respective filter group is formed by the filter regions assigned to a respective analysis wavelength range—that is to say one filter group is respectively assigned to one respective analysis wavelength range.

The filter regions of the filter element can be arranged in rows and columns within the scope of a preferred configuration. In this case, the filter regions of a filter group can be arranged along a row/column, which repeats along the rows/columns (line pattern). Within the scope of an alternative particularly preferred configuration, the filter regions of a filter group can extend over the same number of columns and rows, preferably over two columns and two rows, further preferably over four columns and four rows, in particular over five columns and five rows. This filter group can then repeat like a mosaic over the filter element (mosaic pattern).

The sensor is preferably a semiconductor sensor, in particular a CMOS (complementary metal oxide semiconductor) sensor or a CCD (charge-coupled device) sensor. Such sensors are distinguished in particular by a high sensitivity to light with wavelengths in the near infrared range (NIR range), which is relevant to the analysis of Raman scattered light, in particular from blood sugar. Moreover, such sensors are available in cost-effective fashion, which is advantageous for the use of a system with such a sensor as a mass-market product.

A particularly advantageous configuration consists of the light source being a laser light source. Laser light is distinguished by a high luminous intensity and can be provided in almost monochromatic fashion. A high luminous intensity of the excitation light is particularly important for a good Raman signal since Raman scattering only has a small scattering cross section. Preferably, the laser wavelength is located in the infrared wavelength range, facilitating transmission through human layers of skin. In particular, a laser wavelength between 800 nm and 1000 nm, in particular of 830 nm, was found to be advantageous for a Raman analysis of blood sugar. In particular, the laser light source is a laser diode.

It is preferable for the wavelength of the excitation light to be located outside of the (respective) analysis wavelength range. Consequently, excitation light reflected, or elastically scattered, by the sample can be suppressed by the at least one filter element, i.e., not be passed to the sensor. This can save additional filters which are usually required to suppress the reflected, or elastically scattered, excitation light. This promotes a structurally simple and cost-effective structure. However, depending on the configuration, this does not preclude a component of the excitation light reflected by the sample from striking a portion of the sensor as reference light, as explained above.

Within the scope of a preferred configuration, the optical device can comprise a focusing optical unit which is arranged in the excitation beam path and which serves to focus the excitation light at a focal point in the sample. Moreover, it is preferable for a stop to be arranged in confocal fashion within the detection beam path. In particular, confocal is understood to mean that the focal point of the excitation light in the sample and the center of the stop are simultaneously in the focus. A pinhole aperture consequently suppresses the transmission of light which was scattered outside of the focal point. This renders it possible to be able to analyze only a selected sample volume. In particular, such a confocal structure renders it possible to be able to perform a depth selection.

In the following description and the figures, the same reference signs are used in each case for identical or corresponding features.

FIG. 1 illustrates a first embodiment of a system which as a whole is denoted by the reference sign 10. The system 10 serves to measure the presence and/or or the concentration of an analysis substance dissolved in a bodily fluid, in particular for determining a concentration of sugar, in particular glucose, dissolved in bodily fluid.

The system 10 comprises a light source 12 for emitting excitation light 14. In particular, the light source 12 is a laser diode which emits laser light, for example substantially with a wavelength of 830 nm.

The system 10 further comprises an optical device 16 which is designed to guide the excitation light 14 from the light source 12 to a measurement region 18 of a sample 20, for example a blood-containing tissue region in a human body. In the illustrated example, the optical device 16 has to this end one or more optical elements 30, 32, 36 for beam deflection and/or beam guidance (e.g., lenses, reflectors, deflection mirrors, prisms or the like) which for the excitation light 14 define an excitation beam path 22 from the light source 12 to the measurement region 18 on the sample 20.

The optical device 16 is further designed to guide scattered light 24, in particular Raman scattered light which arises from inelastic scattering of the excitation light 14 on the sample 20, from the measurement region 18 of the sample 20 to a detection device 26. In the illustrated example, the optical device 16 has to this end one or more optical elements 36, 32, 46 for beam deflection and/or beam guidance, which define a detection beam path 28 from the measurement region 18 of the sample 20 to the detection device 26.

Figure 2:
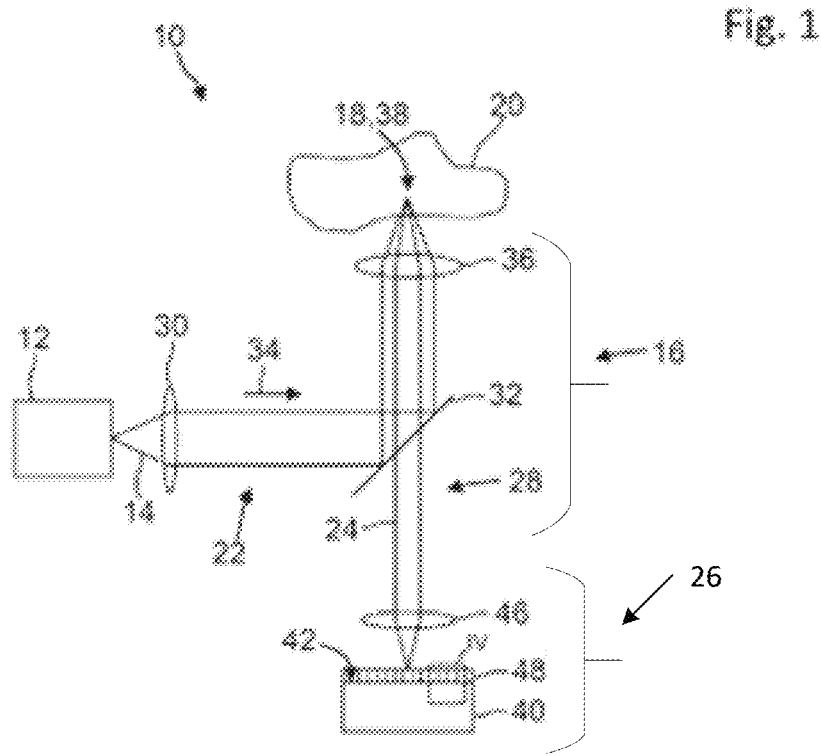
FIG. 2 shows a sketched illustration of a system in a second embodiment.

In the embodiments illustrated in FIGS. 1 and 2, the excitation light 14 emitted by the light source 12 is initially guided via a converging lens 30 to a partly transmissive mirror 32, which is designed to reflect at least a majority of the incident excitation light 14. In the illustrated example, the partly transmissive mirror 32 is arranged at an angle of 45° relative to an incoming radiation direction (cf. the arrow in FIGS. 1 and 2 denoted by 34) of the excitation light 14. In this respect, the incident excitation light 14 is reflected through an angle of 90°. The partly transmissive mirror 32 can be a dichroic mirror, for example. The light reflected by the partly transmissive mirror 32 is focused at a focal point 38 in the sample 20 by means of a focusing optical unit 36. In the exemplary embodiment shown, the focusing optical unit 36 is represented purely in exemplary fashion by a lens.

Raman scattered light 24 is generated by scattering processes of the excitation light 14 at the sample 20. The Raman scattered light 24 is focused by the focusing optical unit 36 and guided to the detection device 26 in the detection beam path 28. In the process, the Raman scattered light 24 passes the partly transmissive mirror 32, which is configured to allow the transmission of at least a majority of the Raman scattered light 24.

Figure 4:
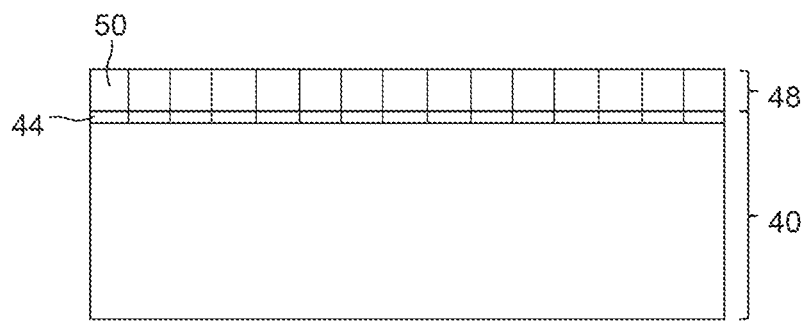
FIG. 4 shows the excerpt denoted by IV in FIG. 2 in an enlarged illustration.

The detection device 26 comprises a light-sensitive sensor 40 which is designed to generate electrical measurement signals from the captured light. In the present example, the sensor 40 is designed as a CMOS sensor. The sensor 40 comprises a detecting sensor surface 42, which preferably has a planar embodiment. The sensor surface 42 comprises an array of light-sensitive pixels 44 which are arranged in rows and columns in a manner known per se and therefore not explained in more detail (cf. FIG. 4). Further, a condenser lens 46 which images the Raman scattered light on the sensor surface 42 can be arranged in the detection beam path 28.

The detection device 26 further comprises a filter element 48, which is arranged in the detection beam path 26 between the sample 20 and the sensor 40. In the illustrated example, the filter element 48 is designed overall as a component with a planar extent, and it extends substantially within a plane. The filter element 48 is embodied to suppress (see above) a transmission of light with wavelengths outside of an analysis wavelength range about a respective selected characteristic Raman resonance of a selected analysis substance, in particular blood sugar (glucose) dissolved in human blood.

In a second preferred embodiment of the system 10, illustrated in FIG. 2, the filter element 48 is arranged on the sensor surface 42 of the sensor 40. In particular, the filter element 48 is connected, in particular integrally connected, to the sensor 40 to form a permanently assembled component part.

Figure 3:
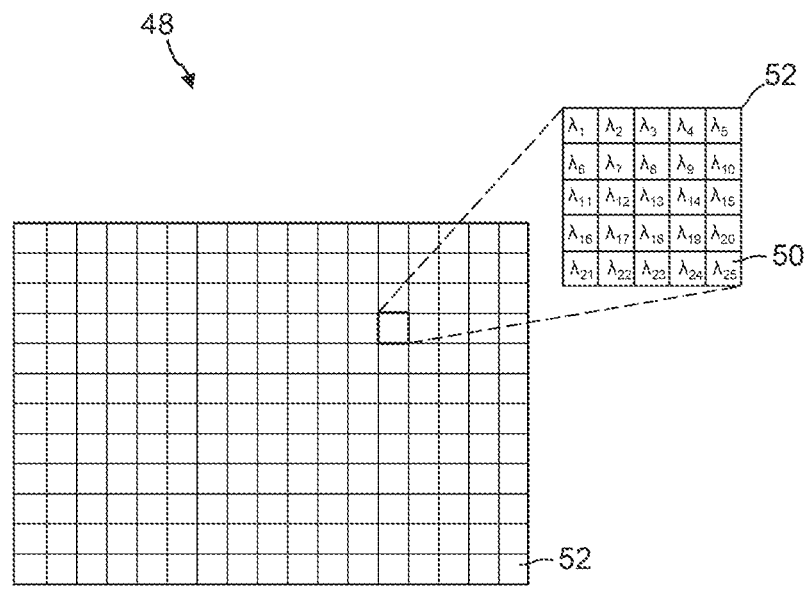
FIG. 3 shows a sketched illustration of a preferred configuration of a filter element in a plan view.

FIG. 3 illustrates a plan view of a preferred configuration of the filter element 48. The filter element 48 has a plurality of narrowband filter regions 50, which are arranged in rows and columns. In this case, the filter regions 50 are arranged such that a filter region 50 is arranged in front of each pixel 44 of the sensor 40 (cf. FIG. 4). Preferably, the pixels 44 and the filter regions 50 have the same dimensions as seen in a direction perpendicular to the sensor surface 42 such that a respective filter region 50 covers the entire detection area of only the pixel 44 assigned thereto and, in particular, covers no other pixels than the assigned pixel. In particular, the filter regions 50 are formed in monolithic fashion with the respective pixels.

In the configuration of the filter element 48 illustrated in FIG. 3, 25 (5×5) filter regions 50 together form a filter group 52, wherein the filter group 52 repeats over the filter element 48 in mosaic-like fashion. The filter regions 50 of the filter group 52 have different central wavelengths $\lambda 1$ to $\lambda 25$, which are located in an analysis wavelength range around the Raman resonance of the analysis substance to be analyzed. In this respect, 25 different spectral ranges (bands) in the analysis wavelength range can be detected independently of one another in the shown configuration.

The central wavelengths are preferably distributed in equidistant intervals over the analysis wavelength range. By way of example, it is possible for the analysis wavelength range to be a range of ±2.5 nm about the Raman resonance (such an analysis wavelength range can be chosen, for example, if the Raman resonance to be analyzed has a spectral width of 5 nm). In this case, an interval of 0.2 nm arises in the case of 25 filter regions 50.

In configurations not illustrated here, it is also possible for the filter regions 50 assigned to a respective analysis wavelength range to repeat over the filter element 48 in irregular fashion.

In further embodiments not illustrated here, there might be no filter region 50 arranged in front of at least one pixel 44. Then, the excitation light reflected, or elastically scattered, from the sample can be detected as reference light by this at least one pixel 44.

In further configurations not illustrated here, it is also possible for a pass range of at least one filter region 50 to be embodied to pass the reflected, or elastically scattered, excitation light at least in part.

In further configurations not illustrated here, a plurality of filter groups 52 can be provided—for analyzing a plurality of characteristic Raman resonances. By way of example, it is possible for three different filter groups 52 to be provided and to repeat in alternating fashion over the filter element 48 in mosaic-like fashion, wherein each filter group 52 is respectively assigned to one Raman resonance to be analyzed. In this respect, the filter regions 50 forming a respective filter group 52 are therefore located in the respective analysis wavelength range of the respective Raman resonance to be analyzed.

The invention claimed is:

1. A system for measuring the presence and/or the concentration of an analysis substance dissolved in a bodily fluid, the system comprising:
   a light source configured to emit excitation light;
   an optical device that defines, for the excitation light, an excitation beam path from the light source to a measurement region of a sample and that defines, for scattered light from the measurement region of the sample, a detection beam path from the measurement region of the sample to a detection device;
   the detection device configured to detect the scattered light;
   wherein the detection device comprises a light-sensitive sensor having a detecting sensor surface, and a filter element arranged in the detection beam path on the detecting sensor surface, wherein the filter element comprises a plurality of narrowband filter regions configured to suppress a transmission of light with wavelengths outside of an analysis wavelength range around a Raman resonance, to be analyzed, of the analysis substance, and wherein each respective narrowband filter region acts as a bandpass filter for a respective wavelength range that is narrower than the analysis wavelength range, wherein the sensor comprises an array of light-sensitive pixels, wherein each respective narrowband filter region is assigned to one pixel group of adjacently arranged pixels, wherein the plurality of narrowband filter regions includes a filter group corresponding to respective central wavelengths that differ from one another, and wherein the central wavelengths are distributed at equidistant intervals over the analysis wavelength range.

2. The system according to claim 1, wherein the analysis wavelength range is around the Raman resonance of less than 1500 nm.

3. The system according to claim 1, wherein the analysis wavelength range is ±10 nm around the Raman resonance of the analysis substance.

4. The system according to claim 1, wherein the filter element is configured such that a component of the scattered light in the detection beam path strikes the sensor as reference light which remained uninfluenced by the filter element.

5. The system according to claim 1, wherein the intervals are less than 5 nm.

6. The system according to claim 1, wherein the filter group repeats over the filter element.

7. The system according to claim 1, wherein the sensor is a semiconductor sensor.

8. The system according to claim 1, wherein the light source is a laser light source.

9. The system according to claim 1, wherein a wavelength of the excitation light is located outside of the analysis wavelength range.

10. The system according to claim 1, wherein the optical device comprises a focusing optical unit arranged in the excitation beam path and configured to focus the excitation light at a focal point in the sample, and wherein a stop is arranged in confocal fashion within the detection beam path.

* * * * *